United States Patent
Peterson et al.

(10) Patent No.: US 9,487,129 B2
(45) Date of Patent: Nov. 8, 2016

(54) METHOD AND SYSTEM TO CONTROL VEHICLE TURN INDICATORS

(71) Applicant: Lenovo (Singapore) Pte. Ltd., New Tech Park, Singapore (SG)

(72) Inventors: Nathan J. Peterson, Durham, NC (US); Amy Leigh Rose, Chapel Hill, NC (US); John Scott Crowe, Durham, NC (US); Bryan L. Young, Apex, NC (US)

(73) Assignee: LENOVO (SINGAPORE) PTE. LTD., New Tech Park (SG)

( * ) Notice: Subject to any disclaimer, the term of this patent is extended or adjusted under 35 U.S.C. 154(b) by 0 days.

(21) Appl. No.: 14/478,119

(22) Filed: Sep. 5, 2014

(65) Prior Publication Data

US 2016/0068099 A1     Mar. 10, 2016

(51) Int. Cl.
*B60Q 1/34* (2006.01)
*G01C 21/26* (2006.01)
*G01C 21/36* (2006.01)

(52) U.S. Cl.
CPC ............ *B60Q 1/34* (2013.01); *G01C 21/3658* (2013.01)

(58) Field of Classification Search
CPC .................................. B60Q 1/34; G01C 21/26
USPC .............................................................. 701/19
See application file for complete search history.

(56) References Cited

U.S. PATENT DOCUMENTS

| | | | |
|---|---|---|---|
| 2004/0100373 A1* | 5/2004 | Ponziani | 340/476 |
| 2009/0174540 A1* | 7/2009 | Smith | B60Q 1/34 340/465 |
| 2012/0271510 A1* | 10/2012 | Seymour et al. | 701/36 |
| 2013/0261880 A1 | 10/2013 | Cho et al. | |
| 2014/0067195 A1 | 3/2014 | James et al. | |

* cited by examiner

*Primary Examiner* — Anne M Antonucci
(74) *Attorney, Agent, or Firm* — Dean D. Small; The Small Patent Law Group, LLC.

(57) ABSTRACT

Methods, systems and program products are provided for obtaining navigation data indicative of a present position of a vehicle and assessing lane restriction information in connection with a road lane corresponding to a present position of the vehicle as designated by the navigation data. The methods, systems and program products also activate a turn indicator of the vehicle based on the lane information and the navigation data. The methods, systems and program products collect navigation data indicative of a present position of a vehicle.

24 Claims, 4 Drawing Sheets

METHOD AND SYSTEM TO CONTROL VEHICLE TURN INDICATORS

BACKGROUND

Embodiments of the present disclosure generally relate to methods, systems and program products that control vehicle turn indicators based on navigation information.

Today, the laws of every state in the United States, as well as in many foreign countries require drivers to use turn on signals at least when making turns at intersections. In many instances, turn signals are also required when changing lanes on a highway or other road.

However, many drivers become lazy, are inexperienced, preoccupied, forget or for other reasons do not turn on turn signals when changing lanes or making turns at intersections. Drivers that change lanes or make turns at intersections without proper signaling create an increased risk of accident and injury.

Heretofore, no mechanism has been provided that assists drivers in properly using turn signals. While vehicles include controllers to automatically turn off turn signals after a certain amount of time or a certain distances traveled, such vehicles lack any mechanism to facilitate proper activation of the turn signals prior to turns and lane changes.

SUMMARY

In accordance with an embodiment, a method is provided for obtaining navigation data indicative of a present position of a vehicle and assessing lane restriction information in connection with a road lane corresponding to a present position of the vehicle as designated by the navigation data. The method also activates a turn indicator of the vehicle based on the lane restriction information and the navigation data.

Optionally, the method may include generating automatically a turn indicator command to initiate the activating operation, and the generating operation supplying the turn indicator command to an onboard diagnostics system of the vehicle to direct the vehicle to automatically turn on a turn signal that represents the turn indicator. Optionally, the method may further comprise determining when the vehicle is located in a "turn only" lane based on the lane restriction information and the navigation data, the turn indicator command being generated automatically when the vehicle is in the "turn only" lane. Optionally, the method may further comprise determining when the vehicle is within a threshold distance from an upcoming turn based on the navigation data, the turn indicator command being generated automatically when the vehicle is within the threshold distance.

Optionally, the method may further comprise determining when the vehicle is located in a "turn optional" lane based on the lane restriction information; determining that the vehicle is approaching a turn candidate intersection based on the navigation data; and analyzing historic driving data indicative of past driving behavior, the turn indicator command being generated automatically when the historic driving data indicates the past driving behavior includes turning at the turn candidate intersection from the turn optional lane. Optionally, the method may further comprise tracking a position of the vehicle along a route to a destination location based on the navigation data, the route including turn intersections, and activating the turn indicator as the navigation data indicates that the vehicle approaches the turn intersections along the route. Optionally, the method may further comprise receiving a destination location and calculating a route between a present position of the vehicle and the destination location. Optionally, the method may further comprise determining whether the vehicle is in a correct turn lane based on the navigation data; and notifying a driver that the vehicle is in a wrong lane when the vehicle is not in the correct turn lane. Optionally, the method may further comprise analyzing historic driving data indicative of past driving behavior, the turn indicator being activated automatically when the historic driving data indicates the past driving behavior includes turning at a candidate turn intersection that the vehicle approaches.

In accordance with an embodiment, a system is provided, which comprises a processor and an input that collects navigation data indicative of a present position of a vehicle. The system also comprises a local storage medium storing program instructions accessible by the processor. Responsive to execution of the program instructions, the processor assesses lane restriction information in connection with a road lane corresponding to a present position of the vehicle as designated by the navigation data; and activates a turn indicator of the vehicle based on the lane restriction information and the navigation data.

Optionally, the system may further comprise a data interface configured to be coupled to an onboard diagnostics system of the vehicle, the processor generates automatically a turn indicator command to activate the turn indicator, the data interface supplying the turn indicator command to the onboard diagnostics system of the vehicle. Optionally, the system may further comprise a GPS module to track the present position of the vehicle and generate the navigation data based thereon. Optionally, the system may further comprise a transceiver configured to wirelessly convey the turn indicator command over a wireless interface to an onboard diagnostics system of the vehicle. Optionally, the system may be configured wherein the local storage medium further stores map information including road related data including lane restriction information indicative of turn restrictions.

Optionally, the system may comprise the processor automatically generates a turn indicator command when the navigation data indicates that the vehicle is in the road lane for which the lane restriction information indicates a turn. Optionally, the system may be comprise the processor updating historic driving data based on at least one of a commuter route, a school route and an afterschool activity route, the processor automatically activating the turn indicator based on the lane restriction information and the historic driving data.

In accordance with an embodiment, a computer program product is provided, comprising a non-transitory computer readable medium having computer executable code to perform operations. The operations comprise obtaining navigation data indicative of a present position of a vehicle. The operations also assess lane restriction information in connection with a road lane corresponding to a present position of the vehicle as designated by the navigation data. The operations also generate automatically a turn indicator command to activate a turn indicator of the vehicle based on the lane information and the navigation data.

Optionally, the code may further comprise generating automatically a turn indicator command and supplying the turn indicator command to an onboard diagnostics system of the vehicle to direct the vehicle to automatically turn on a turn signal that represents the turn indicator. Optionally, the code may further comprise determining when the vehicle is located in a "turn only" lane based on the lane restriction information and the navigation data, the turn indicator being activated automatically when the vehicle is in the "turn only" lane.

DETAILED DESCRIPTION

It will be readily understood that the components of the embodiments as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments. It should be clearly understood that the various arrangements and processes broadly described and illustrated with respect to the Figures, and/or one or more individual components or elements of such arrangements and/or one or more process operations associated of such processes, can be employed independently from or together with one or more other components, elements and/or process operations described and illustrated herein.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

Figure 1:
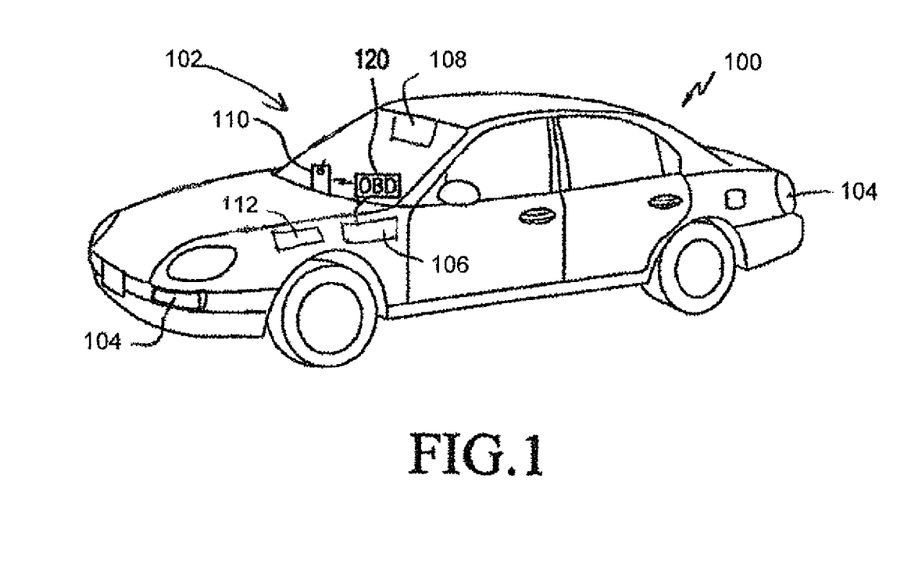
FIG. 1 illustrates a vehicle that includes a navigation assistance system formed in accordance with embodiments herein.

FIG. 1 illustrates a vehicle 100 that includes a navigation assistance system 102 formed in accordance with embodiments herein. The system 102 includes a mobile device 110 that uses GPS coordinates and/or other navigation data to automatically activate (e.g. turn on) and deactivate (e.g. turn off) the turn indicators 104. By way of example, the turn indicators 104 may represent turn signal lights located on the front and/or rear of the vehicle, in the back glass window, on the front and rear dashboards and the like. The turn indicators 104 may represent other types of indicators in addition to lights, such as mechanical devices, audio sounds and the like. The mobile device 110 may communicate with the onboard diagnostic (OBD) system 106 through an OBD terminal 120. The mobile device 110 may include a GPS subsystem (as explained herein). Optionally, the mobile device 110 may communicate with a stand-alone mobile GPS device 108. Optionally, the mobile device 110 may communicate with a built-in GPS system 112 integrated within the control system of the vehicle 100.

On-board diagnostics (OBD) is an automotive term referring to a vehicle's self-diagnostic and reporting capability. On-Board Diagnostics, is a computer-based system built into all 1996 and later light-duty vehicles and trucks, as required by the Clean Air Act Amendments of 1990. OBD systems are designed to monitor the performance of some of an engine's major components including those responsible for controlling emissions. The OBD system 120 give the vehicle owner or repair technician access to the status of the various vehicle sub-systems. The amount of diagnostic information available via OBD has varied widely since its introduction in the early 1980s' versions of on-board vehicle computers. Modern OBD system implementations use a standardized digital communications port to provide real-time data in addition to a standardized series of diagnostic trouble codes, or DTCs, which allow one to rapidly identify and remedy malfunctions within the vehicle.

The mobile device 110 may communicate with the stand-alone mobile GPS device 108 and/or the built-in GPS system 112 through a Bluetooth link, another wired connection, or other available communications protocols/links. As explained hereafter, in accordance with embodiments herein, a navigation route is created by a GPS device/system and a position and speed of the vehicle is tracked with the GPS device/system. Based on the navigation route and the current position/speed of the vehicle, the mobile device 110 determines when the vehicle 100 should be turning. When the driver is in a turn eligible lane, the mobile device 110 activates an appropriate turn indicator signal at an appropriate distance before the turn. Optionally, the mobile device 110 may turn off or deactivate the turn signal following the turn. A "turn eligible" lane represents a lane from which a vehicle is permitted to turn without violating any laws or local ordinances.

In accordance with embodiments herein, the mobile device 110 may operate without preset navigation routes. The GPS device/system 108, 112 tracks the current position and speed of the vehicle 100, while the mobile device 110 monitors which lane of traffic that the vehicle is located. When the vehicle 100 is in a turn only lane and approaching a turn, the mobile device 110 automatically activates (turns on) the turn signals. Following the intersection, the mobile device automatically deactivates (turns off) the turn signals. By monitoring the position of the vehicle relative to lanes of traffic, the mobile device 110 affords a mechanism to assist drivers to properly use turn signals. The mobile device 110 provides a mechanism to facilitate proper activation of the turn signals prior to turns and lane changes, thereby assisting to comply with laws and improve driver safety.

Figure 2:
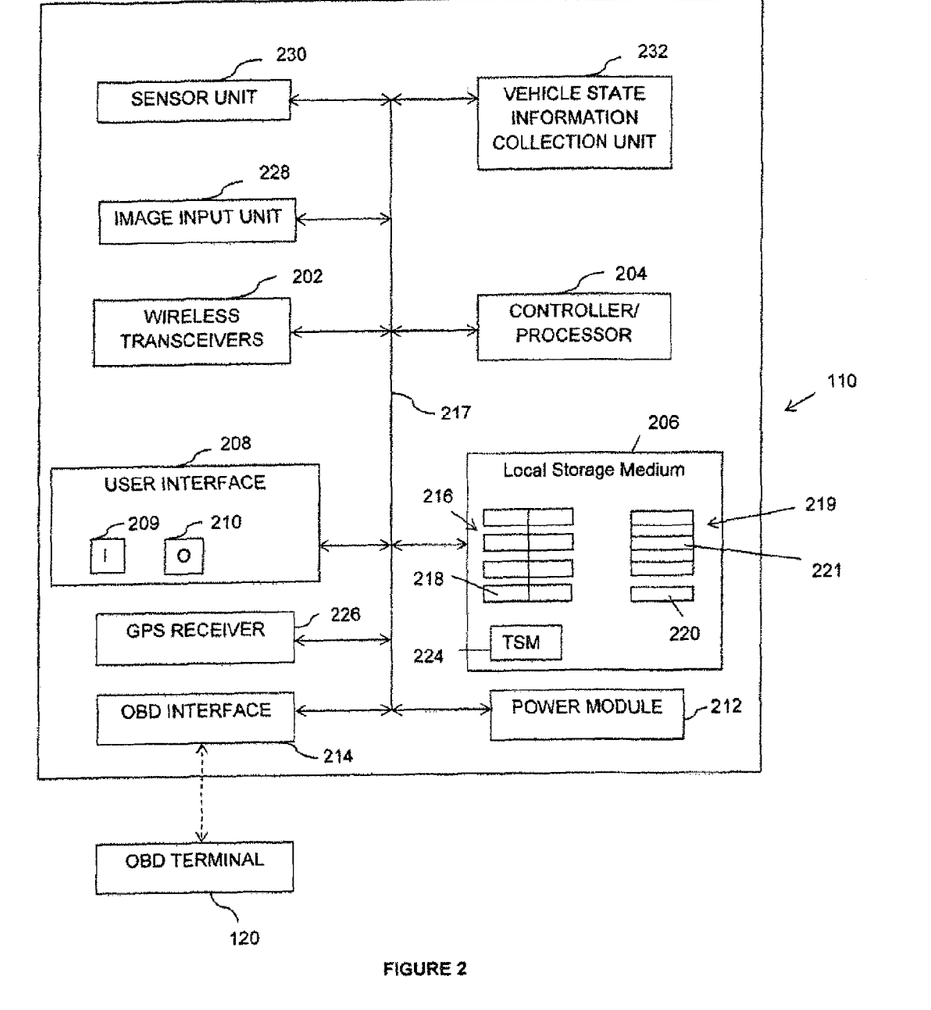
FIG. 2 illustrates a simplified block diagram of an illustrative mobile device in accordance with embodiments herein.

FIG. 2 illustrates a simplified block diagram of the mobile device 110, which includes components such as one or more wireless transceivers 202, one or more processors 204 (e.g., a microprocessor, microcomputer, application-specific integrated circuit, etc.), one or more local storage medium (also referred to as a memory portion) 206, a user interface 208 which includes one or more input devices 209 and one or more output devices 210, a power module 212, an OBD interface 214, and a GPS receiver 226. All of these components can be operatively coupled to one another, and can be in communication with one another, by way of one or more internal communication links 217, such as an internal bus.

The input and output devices 209, 210 may each include a variety of visual, audio, and/or mechanical devices. For example, the input devices 209 can include a visual input device such as an optical sensor or camera, an audio input device such as a microphone, and a mechanical input device such as a keyboard, keypad, selection hard and/or soft buttons, switch, touchpad, touch screen, icons on a touch screen, a touch sensitive areas on a touch sensitive screen and/or any combination thereof. Similarly, the output devices 210 can include a visual output device such as a liquid crystal display screen, one or more light emitting diode indicators, an audio output device such as a speaker, alarm and/or buzzer, and a mechanical output device such as a vibrating mechanism. The display may be touch sensitive to various types of touch and gestures. As further examples, the output device(s) 210 may include a touch sensitive screen, a non-touch sensitive screen, a text-only display, a smart phone display, an audio output (e.g., a speaker or headphone jack), and/or any combination thereof.

The user interface 208 may be configured with a Liquid Crystal Display (LCD) panel. If the LCD panel is implemented into a touch screen, the user interface 208 is used as an input device as well as a display device. The user interface 208 displays user-input information or information to be provided to the user as well as menus. The user interface 208 permits the user to select one or more of a switch, button or icon to collect content elements, and/or enter indicators. As one example, the user may enter a destination location, a candidate route and the like. Examples of candidate routes include commuter routes between a home and a workplace, school routes between a home and/or office and school, afterschool activity route between a home and/or office and various fields or other locations for afterschool sports, music, dance and other activities. As another example, the user may enter one or more predefined touch gestures and/or voice command through a microphone on the mobile device 110. The predefined touch gestures and/or voice command may instruct the mobile device 110 to begin routing to a destination, follow the commuter route, take, "Max to school", take "Abby to basketball practice", and the like.

The local storage medium 206 can encompass one or more memory devices of any of a variety of forms (e.g., read only memory, random access memory, static random access memory, dynamic random access memory, etc.) and can be used by the processor 204 to store and retrieve data. The data that is stored by the local storage medium 206 can include, but need not be limited to, operating systems, applications, user collected content and informational data. Each operating system includes executable code that controls basic functions of the communication device, such as interaction among the various components, communication with external devices via the wireless transceivers 202 and/or the OBD interface 214, and storage and retrieval of applications and data to and from the local storage medium 206. Each application includes executable code that utilizes an operating system to provide more specific functionality for the communication devices, such as file system service and handling of protected and unprotected data stored in the local storage medium 206.

As explained herein, the local storage medium 206 stores content 216, such as historic driving data 216 (e.g., past frequent routes 218), a present GPS route 220, and the like, saved in common or separate memory sections. The past frequent and GPS routes 218, 220 include nodes and route segments connected between the nodes. The nodes represent intersections. The route segments represent portions of a street, highway and the like between intersections. The nodes/intersections may have corresponding turn restrictions and turn instructions. The route segments may similarly have corresponding turn restrictions associated with particular lanes along the street, highway and the like. Additional map, routing, lane restriction and lane related information may be stored in the local storage medium 206 as explained herein.

The navigation data may be stored over time, such as to form a driving history record of historic driving data 216. The historic driving data 216 records frequent paths or routes 218 taken by a vehicle. For example, the historic driving data 216 may store non-navigation routes such as commuter routes between a home and a workplace, school routes between a home and/or office and school, afterschool activity route between a home and/or office and various fields or other locations for afterschool sports, music, dance and other activities. The historic driving data 216 may include frequency and timing information associated with routes, such as the times of day, days of the week and/or season most likely to follow certain commuter, school or afterschool activity routes. The historic driving data 216 may be generated and updated continuously throughout operation of the method, such as through a background application. The historic driving data 216 may be generated by a user programming a series of navigation routes between user entered source and destination locations.

The historic driving data may include information regarding non-navigation routes or non-GPS assisted routes (e.g., the commuter route, school route, and other common routes taken by a vehicle during day-to-day life without the need for audible or visual instructions from a GPS device etc.). The routes are defined by road segments and intersections. Additionally or alternatively, the historic driving data may include information regarding certain intersections, such as intersections through which the driver frequently travels. Certain intersection within the historic driving data may be characterized as candidate intersections or candidate turn intersections when there may be a reason for the vehicle to turn at the corresponding intersection. For example, when following a navigation or GPS assisted route calculated between source and destination locations, the turns along the route represent candidate turn intersections where the route suggests the vehicle turn. As a further example, when the vehicle is not following a particular route, namely non-navigation or non-GPS assisted routes, candidate turn intersections may also arise. For example, a candidate turn intersections may be identified in connection with non-navigation or non-GPS assisted routes such as when the vehicle approaches an intersection saved in the historic driving data as a frequent intersection or saved in the historic driving data as an intersection along a frequent non-navigation route.

The historic driving data may become more reliable over time as more history and detail is collected concerning driving patterns of a vehicle. For example, the historic driving data may indicate that when a vehicle enters certain intersections from a particular direction at certain times of day, the vehicle always turns right. Accordingly, the intersection would be flagged as a candidate turn intersection at which the vehicle is expected to turn right and the processes described herein (e.g. in connection with FIG. 4) would operate in an according manner.

The local storage medium 206 also stores map information 219 to be used herein. The map information 219 may correspond to a road system for a region or area in which the vehicle is located. The map information 219 includes road related data, such as lane restrictions 221. The map information 219 for a select region may be downloaded to the mobile device 110 continuously, periodically, only upon demand and the like. For example, when the TSM application 224 is activated, the TSM application 224 may identify the vehicle's current location through the use of GPS information. The TSM application 224 may then communicate with a remote database of maps, such as through the wireless transceiver 202, to obtain map information 219 for the region in which the vehicle is located. Optionally, the map information 219 may be stored within a mobile GPS device 108, within the built-in GPS system 112, or otherwise. The map information 219 may be pre-stored on the mobile device 110 for the entire United States or for select geographic regions when the TSM application 224 is uploaded. Throughout operation, as the vehicle moves to various geographic regions or a user enters destination locations outside of a local geographic region, the processor 204 may determine a desire to download additional road related data, such as current lane restrictions.

Additionally, the applications stored in the local storage medium 206 include a turn signal management (TSM) application 224 for facilitating the management of activation of turn signals while navigating along a select route, or more generally navigating a vehicle over a road system (with or without a select or candidate route). Operation of the TSM application 224 are described below in connection with FIGS. 3 and 4. The TSM application 224 is preferably activated by default upon start-up of the mobile device 110, and can be activated or disabled via input devices 209 of the user interface 208. In one embodiment, the TSM application 224 may be activated when the mobile device 110 is placed in a predetermined routing mode. As a further example, the TSM application 224 may be activated when the mobile device 110 detects that the mobile device is within a vehicle. For example, the mobile device 110 may link with a Bluetooth or other communications protocol in the vehicle and upon establishing the Bluetooth link, may activate the TSM application 224. The TSM application 224 includes program instructions accessible by the one or more processors 204 to direct a processor 204 to implement the methods, processes and operations described herein including, but not limited to the methods, processes and operations illustrated in the Figures and described in connection with the Figures.

Other applications stored in the local storage medium 206 include various application program interfaces (APIs). The power module 212 preferably includes a power supply, such as a battery, for providing power to the other components while enabling the mobile device 110 to be portable, as well as circuitry providing for the battery to be recharged. The OBD interface 214 provides a direct connection to other devices, auxiliary components, or accessories for additional or enhanced functionality, and in particular, can include a USB or other port for linking to the OBD terminal 120.

Each transceiver 202 can utilize a known wireless technology for communication. Exemplary operation of the wireless transceivers 202 in conjunction with other components of the mobile device 110 may take a variety of forms and may include, for example, operation in which, upon reception of wireless signals, the components of mobile device 110 detect communication signals and the transceiver 202 demodulates the communication signals to recover incoming information, such as voice and/or data, navigation data, GPS coordinates, map data, lane restriction information and the like transmitted by the wireless signals. After receiving the incoming information from the transceiver 202, the processor 204 formats and stores the incoming information. Likewise, for transmission of wireless signals, the processor 204 formats outgoing information, which may or may not be activated by the input devices 210, and conveys the outgoing information to one or more of the wireless transceivers 202 for modulation to communication signals. The transceivers 202 may wirelessly transmit turn indicator commands to the control system of the vehicle, such as to the OBD system. The wireless transceiver(s) 202 convey the modulated signals to a remote device, such as a cell tower or a remote server (not shown).

In accordance with embodiments herein, the transceiver 202 may bi-directionally convey GPS related data and information between the mobile device 110 and a separate GPS module. For example, the separate GPS module 112 may be embedded within the OBD system 106 within the vehicle 100. Alternatively, the GPS module may represent a stand-alone GPS device 108 that is separate and distinct from the mobile device 110. The stand-alone GPS device 108 may interact with the mobile device 110 to perform the turn indicator management operations described herein. The GPS module 112 embedded within the OBD system 106 and/or the stand-alone GPS device 108 may perform route calculation operations, as well as tracking the present position and speed of the vehicle. In this example, the GPS module/device may convey navigation data, such as coordinate information, through the transceiver 202 to the mobile device 110, in order that the mobile device 110 uses such navigation data to determine when and whether to activate turn indicators.

The GPS receiver 226 receives GPS information from GPS satellites. The GPS receiver 226 uses the GPS information to calculate navigation data, as well as a current location and a speed of the vehicle 100 while driving.

The mobile device 110 may also include an image input unit 228, a sensor unit 230, and a vehicle state information collection unit 232. The image input unit 228 generates image data corresponding to external still or video inputs indicative of an environment and features surrounding the vehicle 100. For example, the image input unit 228 may represent one or more cameras positioned within the vehicle and oriented with fields of view directed toward the front of the vehicle, the rear of the vehicle and/or the sides of the vehicle. One or more of the cameras may be oriented to view the road surface and a region in front of the vehicle (e.g. within 5 to 30 feet of the vehicle). The cameras may be oriented with fields of view directed toward positions where road signs may be located. The image input unit 228 collects image data that may be analyzed by the processor 204 to identify a current lane in which the vehicle is located, as well as to determine whether lanes exist to the left and right of the vehicle. When the mobile device 110 is cradled in the vehicle 100, the image input unit 228 captures images of driving conditions and the interior and/or exterior of the vehicle 100.

Optionally, the processor 204 may be configured to process the image data to identify lane restriction information denoted within lanes themselves, such as turn arrows painted on a highway within lanes indicating that a lane is a right turn only lane, a left turn only lane, a straight-right lane, a straight-the left lane, a U-turn lane and the like. The processor 204 may be configured to analyze image data from cameras positioned to capture road signs, such as to identify road signs indicating that a lane is a merge lane, a right turn only lane, a left turn only lane, a straight-right lane, a straight-the left lane, a U-turn lane and the like.

The sensor unit 230 senses the speed, shock, vibration, direction, and inter-vehicle distance of the vehicle 100 in which the mobile device 110 is placed. For example, the sensor unit 230 includes, but not limited to, an inertial sensor such as an accelerometer, a gyroscope, a shock sensor, a tilt sensor, etc., an altimeter, a gravity sensor, and a geomagnetic sensor, alone or in combination. The sensor unit 230 may also be configured with any other type of sensor that can sense movement of the vehicle 100 having the mobile device 110. The processor 204 receives a sensed value or sensed data from the sensor unit 230 and compares the sensed value or sensed data in order to derive non-GPS navigation information, lane change information, direction change information and the like.

The vehicle state information collection unit 232 receives vehicle state information such as an x-degree adjustment of the steering wheel, a fast acceleration, a fast deceleration, an engine overheating, an ECU defect, speed, RPM, a brake signal, an accelerator state, transmission information, etc., from the OBD terminal 120. When the mobile device 110 issues a turn signal command, the vehicle state information collection unit 232 may be paired with the OBD terminal 120 and communicate with the OBD terminal 120, e.g., by a wired connection or short-range wireless communication. The vehicle state information collection unit 232 may request vehicle state information from the OBD terminal 120. The vehicle state information collection unit 232 may periodically receive vehicle state information pushed from the OBD terminal 120.

When the TSM application 224 is activated, the processor 204 controls the image input unit 228 to start to capture images. The image input unit 228 may capture image data continuously, periodically or in response to select events (e.g., a change lane event, approaching an intersection, approaching a turn in a route, etc.). The processor 204 may determine select events based on sensed values (e.g., change of steering wheel direction) received from the sensor unit 230. A predetermined threshold may be used to determine whether a lane change event has occurred. If the sensed value is greater than or equal to the predetermined threshold, the processor 204 determines that a change lane event has occurred, and stores and analyzes new image data from the image input unit 228 to determine a new lane for the vehicle 100. The image data may include still images, a video, etc., that are captured before and after the change lane event occurrence time.

The processor 204 may also store vehicle state information received from the OBD terminal 120 and location information received from the GPS receiver 226 in the local storage medium 206. Optionally, the vehicle state information from the OBD terminal 120 may include information about a traffic state, vehicle shaking, and an inter-vehicle distance, based thereon the processor 204 may generate an event determination condition such as to turn on a turn signal earlier than normal when another vehicle is detected to be approaching quickly in the lane into which the vehicle 100 is to change lanes.

Figure 3:
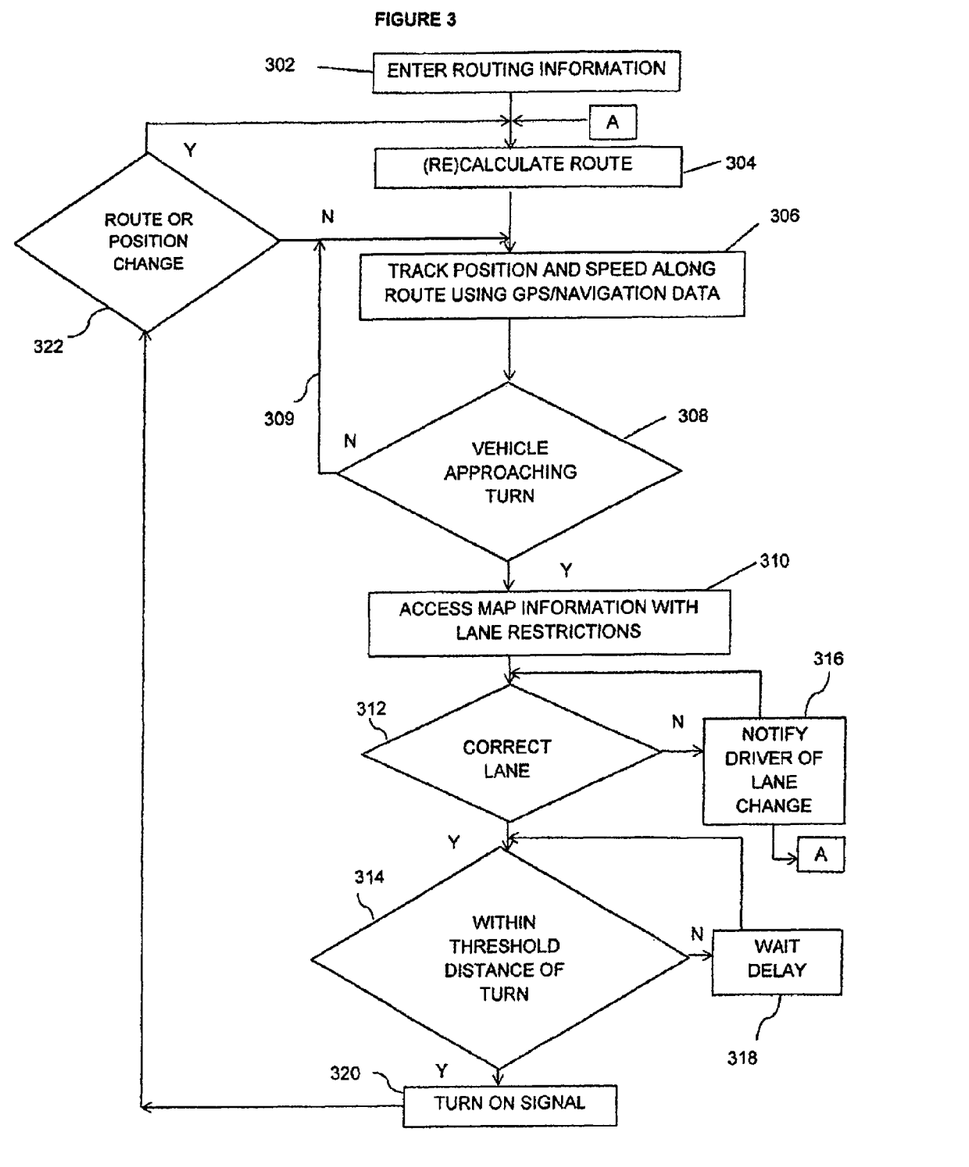
FIG. 3 illustrates a process for automatically controlling turn indicators on a vehicle while navigating along a suggested route in accordance with embodiments.

FIG. 3 illustrates a process carried out in accordance with embodiments for automatically controlling turn indicators on a vehicle while navigating along a suggested route. The operations of FIG. 3 are carried out by one or more processors 204 of the mobile device 110, alone or in combination with the GPS devices and systems and other components in the vehicle 100 of FIG. 1, in response to execution of program instructions, such as in the TSM application 224, and/or other applications stored in the local storage medium 206.

At 302, routing information is entered such as by a user through the user interface 208. For example, the routing information may include a destination location, a saved route, etc.

At 304, a route is calculated or recalculated between source and destination locations (e.g., by the mobile device 110, GPS device 108, GPS system 112). The source location may or may not correspond to the present location of the vehicle. The destination location may have been entered by the user, saved in memory, prerecorded and the like.

At 306, the method begins to track the position and speed of the vehicle along the route (e.g., by the mobile device 110, GPS device 108, GPS system 112). The tracking may be performed based upon GPS information or upon other navigation systems and techniques, such as triangulation between cellular towers and other radio frequency transmission sources. The tracking may be performed, for select periods of time, upon dead reckoning techniques based upon accelerometers or other motion sensors within the sensor unit 230. At 306, the system periodically obtains navigation data indicative of a present position of a vehicle. For example, the system may obtain navigation data every minute, every two seconds, or less frequently based upon the operation settings.

At 308, the method determines whether the vehicle 100 is approaching an intersection corresponding to a turn within the calculated route. When the present vehicle position is not approaching a turn in the route, flow returns along 309 to 306. When the vehicle approaches a turn in the route, flow moves to 310.

At 310, the method accesses the map information 219 for the region surrounding the vehicle. The method identifies road lane related information, such as lane restrictions 221, in the map information 219. Examples of lane restrictions include "no left turn", "no right turn", "no U-turn", and the like for a corresponding select lane. Lane restrictions may also indicate valid options such as a vehicle may continue straight and/or turn right from a particular lane, as well as only continue straight or continue straight and/or turn left from the lane. The method assesses the lane restriction information 221 at 310 in connection with a road lane corresponding to a present position of the vehicle as designated by the navigation data.

At 312, the method determines whether the vehicle is in a lane, for which a valid option permits the vehicle to turn in a direction indicated by the calculated route at the approaching intersection. For example, when the calculated route indicates that a vehicle should take a right turn at the next intersection, at 312, the method determines whether the vehicle is in a lane from which a right turn is permitted.

For example, the vehicle may be in a center (non-turning) lane or left-hand lane when approaching the intersection at which the calculated route calls for a right-hand turn. As another example, the vehicle may be in a center (non-turning) or right-hand lane when approaching the intersection at which the calculated route calls for a left-hand turn. In the foregoing examples, the vehicle would not be able to make the appropriate right or left hand turn without committing a traffic violation. At 312, when the vehicle is in an incorrect (nonturning) lane, flow moves to 316. At 312, when the vehicle is in a correct (turning) lane, flow moves to 314.

At 316, the method may notify the driver of the need to change lanes before the vehicle will be able to make the appropriate turn to maintain the calculated route without committing a traffic violation. For example, the method may notify the driver that the driver needs to switch one or more lanes to the left or right before the approaching intersection. Following the notification at 316, flow returns to 312. While not illustrated, the system collects new position information corresponding to the current position of the vehicle. The determination at 312 is then repeated. If the vehicle has moved, following the notification at 316, to an appropriate turning lane, at 312, the method will determined that the vehicle is now in a correct lane from which an upcoming turn may be conducted to remain on the calculated route without committing a traffic violation. Alternatively, at the second or third iteration through 312, the method may continue to determine that the vehicle has not moved to a correct turning lane. Accordingly, the method may return to the point denoted A.

At 312, when the vehicle is determined to be in a lane that allows or permits the upcoming turn, flow moves to 314. At 314, the method determines whether the vehicle is within a threshold distance to the intersection at which the route calls for a turn. For example, the threshold distance may be 100 to 700 feet, 300 to 500 feet, etc. before the intersection. The threshold distance may vary based upon the speed of the vehicle. For example, a longer threshold distance may be used with vehicles traveling at faster speeds, such as on interstates. Shorter threshold distances may be used with vehicles traveling at slower speeds, such as in residential areas. When the vehicle is outside of (not within) the threshold distance from the intersection, flow moves to 318. At 318, the method waits for the vehicle to move closer to the intersection and the determination at 314 is repeated.

At 314, when a vehicle is within the threshold distance of an intersection, flow moves to 320. At 320, the method automatically generates a turn indicator command to activate a turn indicator of the vehicle based on the lane information and the navigation data. For example, the method supplies the turn indicator command to an onboard diagnostics (OBD) system of the vehicle to direct the vehicle to automatically activate (e.g., turn on) one or more turn signals. The method generates the turn indicator command as the navigation data indicates that the vehicle approaches the route-turn intersection along the route, thereby informing surrounding vehicles that the driver of the present vehicle intends to make a turn at the approaching intersection.

Once the turn indicator command is issued at 320, the process of FIG. 3 may terminate. Alternatively, following the operation at 320, flow may move to 322. At 322, the method determines whether the route has changed and/or whether the present position of the vehicle has changed. When the position of the vehicle changes, but not the route, flow moves from 322 back to 306. When the route changes at 322, flow moves to 304. The operations at 304 to 322 are iteratively repeated throughout navigation of the vehicle to the destination location. The operations of FIG. 3 track a position of the vehicle along a route to a destination location based on the navigation data, where the route including route-turn intersections, at which the method automatically turns on turn signals when appropriate for turns in the route.

Figure 4:
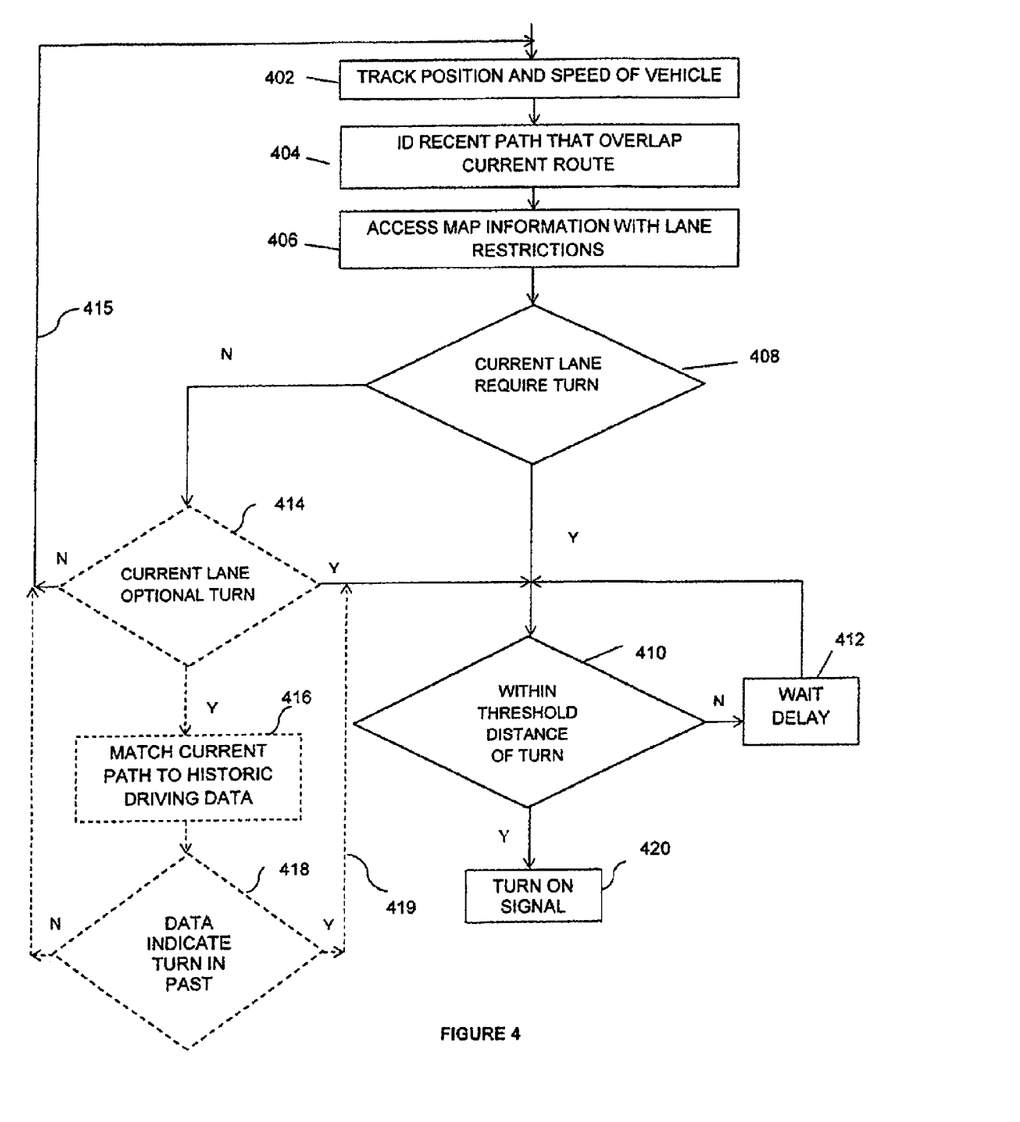
FIG. 4 illustrates a process for automatically controlling turn indicators on a vehicle while travelling along no particular suggested route also referred to a non-navigation route in accordance with embodiments.

FIG. 4 illustrates a process carried out in accordance with embodiments for automatically controlling turn indicators on a vehicle while travelling along no particular suggested route, also referred to a non-navigation route or non-GPS assisted routes. The operations of FIG. 4 are carried out by one or more processors 204 of the mobile device 110, GPS devices and GPS systems, in response to execution of program instructions, such as in the TSM application 224, and/or other applications stored in the local storage medium 206.

At 402, the method begins to track the position and speed of the vehicle. The tracking may be performed based upon GPS information or upon other navigation systems and techniques, such as triangulation between cellular towers and other radio frequency transmission sources. The tracking may be performed, for select periods of time, upon dead reckoning techniques based upon accelerometers or other motion sensors within the system. At 402, the method periodically obtains navigation data indicative of a present position of a vehicle. For example, the method may obtain navigation data every minute, every two seconds, or less frequently based upon the operation settings.

At 404, the method accesses past historic driving data 216. The method reviews past frequent paths or routes (generally non-navigation or non-GPS assisted routes) that the vehicle has followed, such as a commuter route between a home and a workplace, a school route between a home and/or office and school. At 404, the method determines whether a current path followed by the vehicle (e.g. since being started or leaving a saved location) matches or overlaps one or more common routes saved in the historic driving data, such as a commuter route, school route, after-school route and the like. Optionally, the determination at 404 may be entirely omitted and the process of FIG. 4 implemented without regard for historic driving data 216. The making or overlapping paths are held for later use.

At 406, the method accesses the map information 219 for the region surrounding the vehicle. The method identifies road segment and road lane related information, such as lane restrictions 221. The current road segment and current lane may be identified from the GPS coordinates for the present location of the vehicle, and/or from image data. For example, GPS data may identify the road segment and image data may identify the current/active lane. The system assesses the lane restriction information 221 in connection with a road lane corresponding to a present position of the vehicle as designated by the navigation data.

At 408, the method determines whether the vehicle is in a lane, for which the only valid option is for the vehicle to turn at the approaching intersection. For example, the vehicle may be in a right turn lane, or a left turn lane, and thus the vehicle should make a corresponding right or left hand turn at the intersection, or otherwise commit a traffic violation. At 408, when the vehicle is in a turn only lane, flow moves to 410. At 408, when the vehicle is not in a turn-only lane, flow moves to 414.

At 410, the method determines whether the vehicle is within a threshold distance to the intersection at which the lane restriction represents a "turn only" lane. For example, the threshold distance may be 400 to 500 feet before the introduction. The threshold distance may vary based upon the speed of the vehicle. For example, a longer threshold distance may be used with vehicles traveling at faster speeds, such as on interstates. Shorter threshold distances may be used with vehicles traveling at slower speeds, such as in residential areas. When the vehicle is outside of (not within) the threshold the distance from the intersection, flow moves to 412. At 412, the method waits for the vehicle to move closer to the intersection and the determination at 410 is repeated.

At 410, when a vehicle is within the threshold distance of an intersection, flow moves to 420. At 420, the method automatically generates a turn indicator command to turn on a turn signal of the vehicle based on the lane information and the navigation data. For example, the device 110 supplies the turn signal command to an onboard diagnostics (OBD) system of the vehicle to direct the vehicle to automatically activate (e.g., turn on) the turn signal. The device 110 generates the turn signal command as the navigation data indicates that the vehicle approaches the route-turn intersections along the route, thereby informing surrounding vehicles that the driver of the present vehicle intends to make a turn at the approaching intersection.

Hence, when the vehicle is located in a "turn only" lane based on the lane restriction information and the navigation data, the turn signal command is generated automatically.

Once the turn indicator command is issued at 420, the process of FIG. 4 may terminate. Alternatively, following the operation at 420, flow may return to 402. The operations at 404 to 420 are iteratively repeated while the vehicle moves. The operations of FIG. 4 track a position of the vehicle based on the navigation data and automatically activate turn signals when appropriate based on lane restriction information corresponding to a present lane where the vehicle is located.

Returning to 408, when the method determines that the current lane does not require a turn, flow moves to 414. At 414, the method determines whether the current lane permits optional turns. When a turn is not optionally permitted from the current lane, flow returns along 415 to 402. Otherwise, flow may branch in optional alternative directions in accordance with various embodiments.

In one embodiment, when the current lane is designated as an optional turn lane, flow may move from 414 back to 410. As explained herein, at 410 and 412, the method waits for the vehicle to move to within a threshold distance of an intersection, and thereafter activates the turn signal.

In an alternative embodiment, when the current lane is designated as an optional turn lane, flow may move from 414 to 416. At 416, the method analyzes the past historic driving data 216 (if present). As explained above, the historic driving data 216 may indicate one or more frequent paths followed by the vehicle. When frequent paths are stored in the historic driving data, such paths are compared to the current path being followed by the vehicle. At 416, the method determines whether a match exists between the current path being followed by the vehicle and one or more of the frequent paths collected at 406 from the historic driving data. When a match occurs, the frequent path is designated as a candidate route or intersection (e.g., a commuter or school route) that the vehicle potentially is presently following.

At 418, the method identifies candidate turns at intersections along the candidate route from the historic driving data 216. As the vehicle approaches a candidate turn at an intersection along the candidate route, the method determines whether the vehicle is in a lane from which a turn is permitted to follow the candidate route. When the vehicle is potentially following a candidate route and is in a lane from which a turn is permitted, flow returns along 419 back to 410. Flow moves along 419 as the method has determined that the vehicle appears to be following a candidate route, such as a commuter route, a school route, and after school route and the like. Following 419, the method again determines at 410 whether the vehicle is within a threshold distance of the intersection corresponding to a candidate turn within the candidate route. When the vehicle is within the threshold distance of the turn, flow moves to 420 and a turn signal is activated. Alternatively, while the vehicle is outside of the threshold distance, flow moves to 412 where the method waits for the vehicle to move closer to the intersection.

In accordance with the operations at 414-418, when the method determines that the vehicle is located in a "turn optional" lane based on the lane restriction information; determining that the vehicle is approaching a turn candidate intersection and the navigation data; analyzing driver historic data indicative of past driving behavior, the turn signal command being generated automatically when the driver historic data indicates the past driving behavior includes turning at the turn candidate intersection from the turn optional lane.

Remaining at 418, when the historic driving data indicates that no turn has been taken in the past at the upcoming intersection, flow returns along 415 back to 402.

Optionally, while not shown in FIG. 4, when the vehicle appears to be following a candidate route from the historic driving data, the system may notify the driver of the need to change lanes before the vehicle will be able to make the appropriate turn to maintain the candidate route without committing a traffic violation. For example, the system may notify the driver that the driver needs to switch one or more lanes to the left or right before the approaching intersection. Optionally, the system may notify a driver that the vehicle is in a wrong lane when the vehicle is not in the correct turn lane.

Embodiments herein are described in connection with delivering turn indicator commands to the OBD system of the vehicle. Optionally, the turn indicator commands may be supplied to the control system of the vehicle through another intermediary system. The turn indicator commands need not be passed through the OBD system. As one example, the turn indicator commands may be passed directly to a subsystem of the vehicle that operates in connection with controlling turn indicators, such as turn signals.

As will be appreciated by one skilled in the art, various aspects may be embodied as a system, method or computer (device) program product. Accordingly, aspects may take the form of an entirely hardware embodiment or an embodiment including hardware and software that may all generally be referred to herein as a "circuit," "module" or "system." Furthermore, aspects may take the form of a computer (device) program product embodied in one or more computer (device) readable storage medium(s) having computer (device) readable program code embodied thereon. Any combination of one or more non-signal computer (device) readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a dynamic random access memory (DRAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Program code embodied on a storage medium may be transmitted using any appropriate medium, including but not limited to wireless, wireline, optical fiber cable, RF, et cetera, or any suitable combination of the foregoing. Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection.

Aspects are described herein with reference to the figures, which illustrate example methods, devices and program products according to various example embodiments. These program instructions may be provided to a processor of a general purpose computer, special purpose computer, or other programmable data processing device or information handling device to produce a machine, such that the instructions, which execute via a processor of the device implement the functions/acts specified.

The program instructions may also be stored in a device readable medium that can direct a device to function in a particular manner, such that the instructions stored in the device readable medium produce an article of manufacture including instructions which implement the function/act specified. The program instructions may also be loaded onto a device to cause a series of operational steps to be performed on the device to produce a device implemented process such that the instructions which execute on the device provide processes for implementing the functions/acts specified.

The units/modules/applications herein may include any processor-based or microprocessor-based system including systems using microcontrollers, reduced instruction set computers (RISC), application specific integrated circuits (ASICs), field-programmable gate arrays (FPGAs), logic circuits, and any other circuit or processor capable of executing the functions described herein. Additionally or alternatively, the units/modules/controllers herein may represent circuit modules that may be implemented as hardware with associated instructions (for example, software stored on a tangible and non-transitory computer readable storage medium, such as a computer hard drive, ROM, RAM, or the like) that perform the operations described herein. The above examples are exemplary only, and are thus not intended to limit in any way the definition and/or meaning of the term "controller." The units/modules/applications herein may execute a set of instructions that are stored in one or more storage elements, in order to process data. The set of instructions may include various commands that instruct the modules/applications herein to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

It is to be understood that the subject matter described herein is not limited in its application to the details of construction and the arrangement of components set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

It is to be understood that the above description is intended to be illustrative, and not restrictive. For example, the above-described embodiments (and/or aspects thereof) may be used in combination with each other. In addition, many modifications may be made to adapt a particular situation or material to the teachings herein without departing from its scope. While the dimensions, types of materials and coatings described herein are intended to define various parameters, they are by no means limiting and are illustrative in nature. Many other embodiments will be apparent to those of skill in the art upon reviewing the above description. The scope of the embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects or order of execution on their acts.

What is claimed is:

1. A computer-implemented method, comprising:
obtaining navigation data indicative of a present position of a vehicle;
assessing lane restriction information stored in memory, using one or more processors, in connection with a road lane corresponding to a present position of the vehicle as designated by the navigation data;
assessing historic driving data indicating a past route, the historic driving data stored in memory; and
activating a turn indicator of the vehicle, using the one or more processors, based on the historic driving data, lane restriction information and the navigation data, wherein the activating operation comprises automatically generating a turn indicator command using the one or more processors.

2. The method of claim 1, wherein the generating operation supplies the turn indicator command to an onboard diagnostics system of the vehicle to direct the vehicle to automatically turn on a turn signal that represents the turn indicator.

3. The method of claim 1, further comprising determining that the vehicle is located in a "turn only" lane based on the lane restriction information and the navigation data, the turn indicator command being generated automatically in connection with the determining.

4. The method of claim 1, further comprising determining that the vehicle is within a threshold distance from an upcoming turn based on the navigation data, the turn indicator command being generated automatically in connection with the determining.

5. The method of claim 1, further comprising determining that the vehicle is located in a "turn optional" lane based on the lane restriction information; determining that the vehicle is approaching a candidate turn intersection based on the navigation data and based on the historic driving data that includes past routes.

6. The method of claim 1, further comprising:
tracking a position of the vehicle along a route to a destination location based on the navigation data, the route including turn intersections,
the activating operation activates the turn indicator as the navigation data indicates that the vehicle approaches the turn intersections along the route.

7. The method of claim 1, further comprising receiving a destination location and calculating a route between a present position of the vehicle and the destination location.

8. The method of claim 1, further comprising determining whether the vehicle is in a correct turn lane based on the navigation data; and notifying a driver that the vehicle is in a wrong lane when the vehicle is not in the correct turn lane.

9. The method of claim 1, further comprising analyzing the historic driving data indicating the past route, the turn indicator being activated automatically in connection with the historic driving data indicating that the past route includes turning at a candidate turn intersection that the vehicle approaches.

10. The method of claim 1, wherein the activating including activating the turn indicator based on the present position of the vehicle relative to the past route within the historic driving data.

11. The method of claim 1, wherein the assessing of line restriction information comprises accessing the lane restriction information, using the one or more processors, in connection with a road lane corresponding to a present position of the vehicle as designated by the navigation data.

12. A system, comprising:
a processor;
an input that collects navigation data indicative of a present position of a vehicle;
a local storage storing program instructions accessible by the processor;
wherein, responsive to execution of the program instructions, the processor:
assesses lane restriction information in connection with a present position of the vehicle as designated by the navigation data;
assessing historic driving data indicating a past route; and
activates a turn indicator of the vehicle based on the historic driving data, lane restriction information and the navigation data.

13. The system of claim 12, further comprising a data interface configured to be coupled to an onboard diagnostics system of the vehicle, the processor generates automatically a turn indicator command to activate the turn indicator, the data interface supplying the turn indicator command to the onboard diagnostics system of the vehicle.

14. The system of claim 12, further comprising a GPS module to track the present position of the vehicle and generate the navigation data based thereon.

15. The system of claim 13, further comprising a transceiver configured to wirelessly convey the turn indicator command over a wireless interface to an onboard diagnostics system of the vehicle.

16. The system of claim 12, wherein the local storage further stores map information including road related data including the lane restriction information indicating turn restrictions.

17. The system of claim 16, wherein the processor automatically generates a turn indicator command when the navigation data indicates that the vehicle is in the road lane for which the lane restriction information indicates a turn.

18. The system of claim 12, wherein the processor updates the historic driving data based on at least one of a commuter route, a school route and an afterschool activity route, the processor automatically activating the turn indicator based on the lane restriction information and the historic driving data.

19. The system of claim 12, wherein the local storage stores the historic driving data including the past route taken by the vehicle, and wherein the processor activates the turn indicator based on the present position of the vehicle relative to the past route.

20. The system of claim 12, wherein the one or more processors assesses the lane restriction information in connection with a road lane corresponding to a present position of the vehicle as designated by the navigation data.

21. A computer program product comprising a non-signal computer readable storage medium comprising computer executable code to perform:
obtaining navigation data indicative of a present position of a vehicle;
assessing lane restriction information in connection with a present position of the vehicle as designated by the navigation data;
assessing historic driving data indicating a past route; and
activating a turn indicator of the vehicle based on the historic driving data, lane restriction information and the navigation data.

22. The computer program product of claim 21, the code further comprising generating automatically a turn indicator command and supplying the turn indicator command to an onboard diagnostics system of the vehicle to direct the vehicle to automatically turn on a turn signal that represents the turn indicator.

23. The computer program product of claim 21, the code further comprising determining when the vehicle is located in a "turn only" lane based on the lane restriction information and the navigation data, the turn indicator being activated automatically in connection with the determining.

24. The computer program product of claim 21, the code further comprising assessing the lane restriction information in connection with a road lane corresponding to a present position of the vehicle as designated by the navigation data.

* * * * *